Patented May 20, 1952

2,597,755

UNITED STATES PATENT OFFICE 2,597,755

RECOVERY OF NITRATED KEROSENE

Robert A. Shurter, Terre Haute, Ind., assignor to Commercial Solvents Corporation, Terre Haute, Ind., a corporation of Maryland No Drawing. Application January 26, 1950, Serial No. 140,747

8 Claims. (Cl. 260—644)

My invention relates to the nitration of hydrocarbons and more particularly to the recovery of nitrated kerosene from crude reaction mixtures thereof.

Various methods of recovering the kerosene actually nitrated from a solution of crude nitrated kerosene have been used in the past, however, each of these methods has been attended by some outstanding difficulty which has prevented the smooth, economical and efficient recovery long sought. For example, attempts have been made to steam distill the kerosene from crude mixtures of nitrated kerosene and kerosene but the vapor pressures of the constituents of nitrokerosene and kerosene overlap and thus very poor separation of the components is obtained. Furthermore, the amount of steam required is so exceptionally high as to make the process very uneconomical. Vacuum rectification of crude nitrated kerosene also failed because of the overlapping boiling points of kerosene and nitrokerosene. Various solvent extraction processes have failed due to difficulties such as poor extraction and density reversal of the components which occurs in the case of continuous countercurrent methanol extraction.

The object of the present invention is to provide a simple, efficient, and economical process for the recovery of kerosene actually nitrated from the crude reaction solution of said nitrated kerosene.

I have found that about 98% of the material actually nitrated can be recovered from crude nitration reaction mixtures of nitrokerosene and kerosene by extraction with nitromethane. The extraction can be carried out batchwise or it can be carried out in a continuous process involving countercurrent extraction in a column such as a packed column, a column containing plates, a column depending on height alone for its efficiency, or a Scheibel column which latter type is a column containing a number of so-called stages, each stage comprising a packed section and a section wherein the material is agitated by means of a small propeller. In the application of batch extraction, the crude mixture of nitrated kerosene and kerosene is mixed with nitromethane, the mixture agitated and the lower layer comprising the nitrated kerosene and nitromethane then separated. In the case of the continuous countercurrent extraction, the crude mixture of nitrated kerosene and kerosene is introduced at the bottom of the column and the nitromethane at the top. The mixture of extracted nitrated material in nitromethane is then taken off at the bottom of the column while the spent crude kerosene comes off at the top.

Following the extraction of the nitrated kerosene from the crude nitration reaction mixture with nitromethane, I then separate the nitrated material by stripping off the nitromethane at reduced pressure. The process provides a method whereby the nitromethane used is recovered for subsequent reuse in the process. In a continuous system, this can be accomplished by circulating the nitromethane back to the extraction column.

Most processes for the nitration of kerosene ordinarily produce an amount of material actually nitrated which is equivalent to approximately 25% by volume of the crude kerosene introduced into the nitration reaction. That being true, my invention provides a means for efficiently and economically concentrating crude nitrokerosene into approximately one-fourth of its original volume. The reduction in volume which I obtain naturally depends on the amount of nitrated material present in the crude nitration reaction mixture. My process, however, is operative in recovering kerosene actually nitrated regardless of the original concentration of nitrated material in the crude nitration reaction mixture. Furthermore, my process can be used for the recovery of nitrated kerosene from a mixture of nitrokerosene with any other material provided nitromethane is inert to said other material and provided the solubility of said other material in nitromethane-nitrokerosene mixtures is very small.

In carrying out my invention, I have found that by heating the crude nitrokerosene and the nitromethane to from 60° to 90° C. before extraction, I can forestall the tendency of the two fluids to emulsify, and, in the case of continuous extraction, reduce the separating time of the fluids at the interface. For batch extraction of the nitrated kerosene, it is not absolutely necessary to preheat the crude nitrokerosene and the nitromethane because the agitation is less vigorous than in the continuous extraction process. However, I prefer to preheat the materials even in batch extraction.

In practicing my invention, I use from 0.5 to 2.0 volumes of nitromethane per volume of crude nitrated kerosene and I prefer to use one volume of nitromethane per volume of crude nitrated kerosene. I have found that amounts near the lower limit are characterized by slightly lower yields if applied to usual concentrations (about 25% by volume) of nitrated kerosene in the crude nitration reaction mixture. The upper limit of amounts of nitromethane to be used is determined by the solubility of kerosene in nitromethane. If amounts above the limit set out above are used, the amount of kerosene in the final nitrokerosene product will be undesirably high. However, if the nitrokerosene concentration in the crude nitration mixture is unusually high (above 30%) then amounts of nitromethane in excess of the amount indicated above can be used satisfactorily.

The process of my invention is preferably carried out by dividing the amount of nitromethane into approximately 5 equal parts by volume and then extracting the entire amount of crude nitrated kerosene once with each aliquot of nitromethane, subsequently compositing the solvent extract mixtures. If the continuous counter-current extraction method is chosen, the above result is obtained by employing a column containing the number of theoretical plates required to effect substantially complete transfer of the nitrokerosene from the reaction mixture to the nitromethane. A theoretical plate could be an actual plate if said actual plate had an efficiency of 100%, a packed section equivalent to a theoretical plate, a height of column equivalent to a theoretical plate, or, in the case of the above described Scheibel column, a stage equivalent to a theoretical plate.

After the crude nitrated kerosene mixture and the nitromethane have been contacted in the batch variation of my process, the resulting mixture upon standing separates into two layers. The lower layer is made up of the nitrated kerosene and nitromethane and the upper layer is made up of the spent crude kerosene. The layers are separated and the spent crude material can be distilled to recover small amounts of dissolved nitromethane. If the continuous extraction process is chosen, the mixture of nitrated kerosene and nitromethane is taken off the column already separated from the spent crude kerosene.

The nitromethane is then removed from the nitrated kerosene by stripping it at reduced pressure. This enables distillation to proceed without raising the temperature to the decomposition point of the nitrated kerosene components. By using a falling film column the diameter of which becomes progressively smaller down through its length, spraying the mixture of nitromethane and nitrokerosene on the inner walls at the top of the column and by using a pressure of approximately 100 mm. mercury, about 98% of the nitromethane can be removed very quickly. The entire amount of nitromethane removed will not be recovered since there is some loss. In carrying out the nitromethane removal, it is desirable to use a column such that only one pass of the mixture through the column is required but where necessary I make from about two to four passes of the mixture through the column to obtain maximum efficiency.

The following example is offered to illustrate one embodiment of my invention though it is to be understood that I am not to be limited to the procedure as shown.

*Example*

A 148-ml. portion of nitromethane was divided into 5 equal portions of 29.6 ml. each. One of the portions was preheated to 75° C. and then mixed with 160 ml. of a crude nitration reaction mixture of nitrated kerosene and kerosene also preheated to 75° C. The mixture was agitated for approximately five minutes and then allowed to stand for approximately 15 minutes. The mixture settled into two layers and the bottom layer, comprising a mixture of nitrated kerosene and nitromethane, was separated. The top layer comprising the crude nitration reaction mixture of nitrated kerosene and kerosene was then extracted with each of the four other 29.6 ml. portions of nitromethane in the manner stated above. After the crude nitration reaction mixture of nitrated kerosene and kerosene had been extracted with each of the aliquot portions of nitromethane, the product extracts were composited and the entire composited mixture of nitrated kerosene and nitromethane run two times through a falling film column at a pressure of 100 mm. mercury. From the column, 46 ml. of nitrated kerosene corresponding to a yield of 97% was obtained. The nitromethane recovered amounted to 140 ml. or 95% of the amount used.

What I claim is:

1. A process for the recovery of the nitroparaffin components from a mixture produced by the nitration of kerosene which comprises extracting said crude mixture with nitromethane, separating the layers which form, removing the nitromethane from the product extract by a distillation adapted to minimize decomposition of the nitroparaffins, and thereby recovering the nitrated kerosene.

2. A process for the recovery of nitrokerosene which comprises extracting said nitrokerosene from crude nitration reaction mixtures thereof with nitromethane, separating the extract layer which forms, stripping the nitromethane from said extract layer, and thereby recovering the nitrated kerosene.

3. A process for the recovery of nitrokerosene which comprises extracting said nitrokerosene from crude nitration reaction mixtures thereof with from 0.5 to 2.0 volumes of nitromethane, separating the extract layer which forms, stripping the nitromethane from said extract layer, and thereby recovering the nitrated kerosene.

4. A process for the recovery of nitrokerosene from crude nitration reaction mixtures thereof which comprises extracting said nitrokerosene with from 0.5 to 2.0 volumes of nitromethane at a temperature sufficient to prevent emulsifying but insufficient to cause decomposition of the nitrokerosene, separating the layers which form, stripping the nitromethane from the product layer at 0.1 to 0.5 atmosphere pressure, and thereby recovering the nitrated kerosene.

5. A process for the recovery of nitrokerosene from crude nitration reaction mixtures thereof which comprises extracting said nitrokerosene with an equal volume of nitromethane at a temperature of 75° C., separating the layers which form, stripping the nitromethane from the product layer at a pressure of 100 mm. mercury, and thereby recovering the nitrated kerosene.

6. In a process for the recovery of nitrokerosene from crude nitration reaction mixtures thereof, the step which comprises extracting said nitrokerosene with nitromethane.

7. In a process for the recovery of nitrokerosene from crude nitration reaction mixtures thereof, the step which comprises extracting said nitrokerosene with from 0.5 to 2.0 volumes of nitromethane at a temperature of from 60° C. to 90° C.

8. In a process for the recovery of the nitroparaffin components from a mixture produced by the nitration of kerosene, the step which comprises extracting the said mixture with an equal volume of nitromethane, said nitromethane and said nitration mixture having been preheated to a temperature sufficient to prevent emulsifying and insufficient to cause decomposition of said nitroparaffin components.

ROBERT A. SHURTER.

REFERENCES CITED

The following references are of record in the file of this patent:

UNITED STATES PATENTS

| Number | Name | Date |
|---|---|---|
| 2,511,433 | Fiala | June 13, 1950 |

OTHER REFERENCES

Haas et al.: Chem. Reviews, vol. 32, pages 386–387 (1943).